US008521578B2

(12) United States Patent
Hummel

(10) Patent No.: US 8,521,578 B2
(45) Date of Patent: Aug. 27, 2013

(54) METHOD OF DETERMINING WHETHER TO DEVELOP PRODUCTS FOR POTENTIAL CUSTOMERS

(75) Inventor: Parl C. Hummel, Manchester, MO (US)

(73) Assignee: The Boeing Company, Chicago, IL (US)

( * ) Notice: Subject to any disclaimer, the term of this patent is extended or adjusted under 35 U.S.C. 154(b) by 545 days.

(21) Appl. No.: 12/372,143

(22) Filed: Feb. 17, 2009

(65) Prior Publication Data
US 2009/0150227 A1    Jun. 11, 2009

Related U.S. Application Data

(63) Continuation-in-part of application No. 10/753,889, filed on Jan. 7, 2004, now abandoned.

(51) Int. Cl.
    *G06F 17/50*      (2006.01)

(52) U.S. Cl.
    USPC ........................................................ 705/7.29

(58) Field of Classification Search
    USPC ......................................................... 705/7.29
    See application file for complete search history.

(56) References Cited

U.S. PATENT DOCUMENTS

| | | | |
|---|---|---|---|
| 7,216,087 B2 * | 5/2007 | Thompson et al. | 705/7.29 |
| 2003/0115025 A1 * | 6/2003 | Lee et al. | 703/1 |
| 2005/0010472 A1 * | 1/2005 | Quatse et al. | 705/14 |

OTHER PUBLICATIONS

Kyle D. Chen & Warren H. Hausman, "Technical Note: Mathematical Properties of the Optimal Product Line Selection Problem Using Choice-Based Conjoint Analysis," 46 Management Science 327-332 (2000).*

Paul E. Green & Abba M. Krieger, "Models and Heuristics for Product Line Selection," 4 Marketing Science 1-19 (1985).*

Goker Aydin & Jennifer K. Ryan, "Product Line Selection and Pricing Under the Multinomial Logit Choice Model," Apr. 30, 2000, pp. 1-49.*

Rajeev Kohli & R. Sukumar, "Heuristics for Product-Line Design Using Conjoint Analysis," 36 Management Science 1464-1478 (1990).*

Ursula G. Kraus & Candace Arai Yano, "Product Line Selection and Pricing Under a Share-of-Surplus Choice Model," 150 European Journal of Operations Research 653-671 (2003).*

Suresh K. Nair et al., "Near Optimal Solutions for Product Line Design and Selection: Beam Search Heuristics," 41 Management Science 767-785 (1995).*

(Continued)

*Primary Examiner* — R. David Rines
*Assistant Examiner* — Amanda Gurski
(74) *Attorney, Agent, or Firm* — Harness, Dickey & Pierce, P.L.C.

(57) ABSTRACT

A method is disclosed for determining whether to develop products for potential customers. The method may involve: identifying a plurality of potential products; identifying a plurality of potential customers; assessing salability attributes of the potential products from perspectives of the potential customers to generate attribute assessments; using an input device to enable a user to input the pluralities of potential products and potential customers, as well as the attribute assessments, to a processor; using the processor to determine, for each of the potential products, and using the attribute assessments, all possible implementation combinations in which at least n of the potential customers implement the product, where n is a positive whole number; using the processor to determine the probability of each implementation combination, for each product; and using the processor to assist in determining, based upon the probability determinations, which of the potential products to develop.

15 Claims, 3 Drawing Sheets

(56) References Cited

OTHER PUBLICATIONS

Winfried J. Steiner & Harald Hruschka, "A Probabilistic One-Step Approach to the Optimal Product Line Design Problem using Conjoint and Cost Data," 1 Review of Marketing Science Working Papers (2002), pp. 1-40.*

Chen, Kyle D and Hausman, Warren H; "Technical Note: Mathematical Properites of the Optimal Product Line Selection PRoblem Using Choice-Based Conjoint Analysis," vol. 46 Management Science, pp. 327-332, Feb. 2000.*

Green, Paul and Krieger, Abba, "Models and Heuristics for Product Line Selection," Marketing Science vol. 4, pp. 1-19, Winter 1985.*

Boas, M. L. "Mathematical Methods in the Physical Sciences," John Wiley & Sons, New York, 1966, pp. 672-719.

* cited by examiner

| PRODUCT | REQUIRABILITY | | | | | AFFORDABILITY | | | | | SCHEDULABILITY | | | | | PROBABILITY OF REUSE | | | | | BERNOULLI ANALYSIS | |
|---|---|---|---|---|---|---|---|---|---|---|---|---|---|---|---|---|---|---|---|---|---|---|
| T1 | USER 1 | USER 2 | USER 3 | USER 4 | USER 5 | USER 1 | USER 2 | USER 3 | USER 4 | USER 5 | USER 1 | USER 2 | USER 3 | USER 4 | USER 5 | USER 1 | USER 2 | USER 3 | USER 4 | USER 5 | E(N) | P(N≥1) |
| PRODUCT 1 | 0.30 | 0.10 | 0.00 | 0.90 | 0.45 | 0.90 | 0.90 | 0.00 | 0.90 | 0.90 | 0.00 | 0.00 | 0.00 | 1.00 | 1.00 | 0.00 | 0.00 | 0.00 | 0.81 | 0.41 | 0.215 | 0.8870 |
| PRODUCT 2 | 0.30 | 0.90 | 0.30 | 0.30 | 0.45 | 0.90 | 0.90 | 0.90 | 0.90 | 0.90 | 1.00 | 0.00 | 1.00 | 1.00 | 1.00 | 0.27 | 0.27 | 0.27 | 0.27 | 0.41 | 0.215 | 0.7685 |
| PRODUCT 3 | 0.60 | 0.10 | 0.10 | 0.90 | 0.45 | 0.90 | 0.90 | 0.90 | 0.30 | 0.90 | 1.00 | 1.00 | 1.00 | 0.00 | 1.00 | 0.54 | 0.09 | 0.09 | 0.00 | 0.41 | 0.125 | 0.7733 |
| PRODUCT 4 | 0.30 | 0.10 | 0.10 | 0.90 | 0.45 | 0.90 | 0.90 | 0.90 | 0.90 | 0.90 | 1.00 | 0.00 | 1.00 | 0.00 | 1.00 | 0.27 | 0.00 | 0.09 | 0.00 | 0.41 | 0.035 | 0.7115 |
| PRODUCT 5 | 0.30 | 0.30 | 0.30 | 0.60 | 0.45 | 0.90 | 0.90 | 0.90 | 0.30 | 0.90 | 0.00 | 1.00 | 1.00 | 0.00 | 1.00 | 0.00 | 0.27 | 0.27 | 0.00 | 0.41 | 0.945 | 0.6829 |
| PRODUCT 6 | 0.30 | 0.10 | 0.10 | 0.90 | 0.45 | 0.90 | 0.90 | 0.90 | 0.90 | 0.90 | 0.00 | 1.00 | 1.00 | 1.00 | 1.00 | 0.00 | 0.09 | 0.09 | 0.27 | 0.41 | 0.855 | 0.6403 |
| PRODUCT 7 | 0.30 | 0.10 | 0.10 | 0.90 | 0.45 | 0.90 | 0.90 | 0.90 | 0.90 | 0.90 | 0.00 | 1.00 | 1.00 | 0.00 | 1.00 | 0.00 | 0.09 | 0.09 | 0.00 | 0.41 | 0.855 | 0.6403 |
| PRODUCT 8 | 0.30 | 0.00 | 0.10 | 0.90 | 0.45 | 0.90 | 0.90 | 0.90 | 0.30 | 0.90 | 1.00 | 1.00 | 1.00 | 0.00 | 1.00 | 0.27 | 0.00 | 0.09 | 0.00 | 0.41 | 0.675 | 0.5656 |
| PRODUCT 9 | 0.30 | 0.10 | 0.00 | 0.90 | 0.00 | 0.90 | 0.90 | 0.90 | 0.90 | 0.00 | 1.00 | 1.00 | 1.00 | 0.00 | 0.00 | 0.27 | 0.09 | 0.00 | 0.00 | 0.00 | 0.450 | 0.3955 |
| PRODUCT 10 | 0.10 | 0.00 | 0.00 | 0.90 | 0.45 | 0.10 | 0.90 | 0.00 | 0.90 | 0.90 | 1.00 | 1.00 | 1.00 | 0.00 | 1.00 | 0.01 | 0.00 | 0.00 | 0.00 | 0.41 | 0.415 | 0.4109 |
| PRODUCT 11 | 0.90 | 0.10 | 0.10 | 0.90 | 0.45 | 0.30 | 0.00 | 0.00 | 0.30 | 0.30 | 0.00 | 1.00 | 1.00 | 0.00 | 1.00 | 0.00 | 0.00 | 0.00 | 0.00 | 0.14 | 0.315 | 0.2837 |
| PRODUCT 12 | 0.30 | 0.10 | 0.10 | 0.90 | 0.00 | 0.90 | 0.90 | 0.00 | 0.30 | 0.00 | 1.00 | 0.00 | 1.00 | 1.00 | 0.00 | 0.27 | 0.00 | 0.00 | 0.27 | 0.00 | 0.270 | 0.2700 |
| PRODUCT 13 | 0.30 | 0.00 | 0.00 | 0.90 | 0.00 | 0.90 | 0.90 | 0.00 | 0.10 | 0.00 | 1.00 | 1.00 | 0.00 | 1.00 | 1.00 | 0.27 | 0.00 | 0.00 | 0.00 | 0.00 | 0.270 | 0.2700 |
| PRODUCT 14 | 0.30 | 0.00 | 0.00 | 0.90 | 0.00 | 0.90 | 0.00 | 0.00 | 0.90 | 0.00 | 1.00 | 1.00 | 1.00 | 0.00 | 1.00 | 0.27 | 0.00 | 0.00 | 0.00 | 0.00 | 0.270 | 0.2700 |
| PRODUCT 15 | 0.30 | 0.00 | 0.00 | 0.00 | 0.00 | 0.90 | 0.00 | 0.00 | 0.90 | 0.00 | 1.00 | 1.00 | 1.00 | 0.00 | 1.00 | 0.27 | 0.00 | 0.00 | 0.00 | 0.00 | 0.270 | 0.2700 |
| PRODUCT 16 | 0.30 | 0.00 | 0.00 | 0.00 | 0.45 | 0.30 | 0.00 | 0.00 | 0.30 | 0.30 | 1.00 | 1.00 | 1.00 | 1.00 | 1.00 | 0.09 | 0.00 | 0.00 | 0.00 | 0.14 | 0.225 | 0.2129 |
| PRODUCT 17 | 0.10 | 0.10 | 0.10 | 0.90 | 0.00 | 0.10 | 0.10 | 0.10 | 0.10 | 0.00 | 1.00 | 1.00 | 1.00 | 1.00 | 0.00 | 0.01 | 0.01 | 0.01 | 0.00 | 0.00 | 0.020 | 0.0199 |
| PRODUCT 18 | 0.10 | 0.00 | 0.10 | 0.00 | 0.00 | 0.90 | 0.00 | 0.00 | 0.90 | 0.00 | 0.00 | 0.00 | 0.00 | 0.00 | 0.00 | 0.00 | 0.00 | 0.00 | 0.00 | 0.00 | 0.000 | 0.0000 |
| PRODUCT 19 | 0.90 | 0.90 | 0.90 | 0.90 | 0.45 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.000 | 0.0000 |
| PRODUCT 20 | 0.00 | 0.00 | 0.10 | 0.00 | 0.00 | 0.30 | 0.30 | 0.30 | 0.30 | 0.10 | 0.00 | 0.00 | 0.00 | 0.00 | 0.00 | 0.00 | 0.00 | 0.00 | 0.00 | 0.00 | 0.000 | 0.0000 |
| PRODUCT 21 | 0.30 | 0.10 | 0.10 | 0.90 | 0.45 | 0.10 | 0.10 | 0.10 | 0.10 | 0.10 | 0.00 | 0.00 | 0.00 | 0.00 | 0.00 | 0.00 | 0.00 | 0.00 | 0.00 | 0.00 | 0.000 | 0.0000 |
| PRODUCT 22 | 0.90 | 0.90 | 0.90 | 0.90 | 0.45 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.000 | 0.0000 |
| PRODUCT 23 | 0.00 | 0.30 | 0.10 | 0.00 | 0.00 | 0.90 | 0.90 | 0.90 | 0.10 | 0.10 | 0.00 | 0.00 | 0.00 | 0.00 | 0.00 | 0.00 | 0.00 | 0.00 | 0.00 | 0.00 | 0.000 | 0.0000 |

FIGURE 2

METHOD OF DETERMINING WHETHER TO DEVELOP PRODUCTS FOR POTENTIAL CUSTOMERS

CROSS-REFERENCE TO RELATED APPLICATIONS

This application is a continuation-in-part of U.S. patent application Ser. No. 10/753,889, filed on Jan. 7, 2004, presently pending. The disclosure of the above application is incorporated herein by reference.

FIELD

The present disclosure relates to systems and methods for determining whether to develop products for potential customers, and more particularly to a system and method that uses expert opinion about product and customers to manufacture statistical information on the likelihood of use of a product by a single customer versus use by multiple customers, to assist an entity in determining how to cost effectively develop and/or manufacture the product.

BACKGROUND

Traditional product development efforts are isolated programs that focus little effort on reusing products (e.g., hardware or software) that are developed elsewhere within a contracting company. Specifically, the situation often arises where an entity is required to reinvent (or redevelop or re-engineer) a previously developed product to tailor it for a different customer, different market, or different application. For example, consider the situation where a product is reinvented for a second customer, for example a software product originally developed for a first customer that was intended to be used with only one type of helicopter (or one helicopter Program Management Office), but where the reinvented product now performs essentially the same function as the earlier developed product but for a different use (e.g., a different type of helicopter or a different helicopter Program Management Office). Or consider the example of a product that was initially developed for a first customer that is reinvented or redeveloped with the capability to meet the needs of a plurality of different customers or different applications. In either event, the operation of reinventing or re-developing the product to meet the specific needs of one of more additional customers, or one or more additional applications, can be costly in terms of development, procurement, operation and support. In some instances if the entity had known in advance that a given product was highly likely to be used by multiple customers or in multiple applications, the better business decision, at least from a cost development standpoint for the product, may have been to initially design the product with the capability to accommodate the needs of different customers and/or to meet the needs of different applications. Such a decision would have eliminated the need to redevelop the product at a future time. However, it is often difficult or impossible for an entity to forecast the likelihood that a given product will be used by multiple customers or in multiple different applications. Thus, the entity is inclined to select the lowest initial cost approach for developing the initial product, even though such a decision may not turn out to be the most cost effective decision if the product needs to be redeveloped in the future to meet the needs of different customers or different applications.

SUMMARY

In one aspect the present disclosure relates to a method of determining whether to develop products for potential customers. The method may comprise: identifying a plurality of potential products; identifying a plurality of potential customers; assessing salability attributes of the potential products from the perspective of the potential customers, to generate attribute assessments relating thereto; using an input device to enable a user to input the pluralities of potential products and potential customers and attribute assessments to a processor; using the processor to determine, for each of the potential products and using the attribute assessments, all possible implementation combinations in which at least n of the potential customers implement the product, where n is a positive whole number; using the processor to determine the probability of each implementation combination, for each product; and using the processor to assist in determining, based upon the probability determinations, which of the potential products to develop.

In another aspect the present disclosure relates to a method for assisting in determining whether to develop products for potential customers. The method may comprise: identifying a first quantity of information relative to potential products; identifying a second quantity of information of potential customers; identifying a third quantity of information relating to a plurality of factors useful in determining a likelihood of use by a given potential customer, of a given one of the potential products; providing an input device for enabling an individual to input the first, second and third quantities of information to a processor; using the processor to transform the quantities of information from qualitative values to quantitative values to assist in determining, for each of the potential products, all possible implementation combinations in which at least "n" of the potential customers implement the product, where n is a positive whole number; using the processor, in connection with the third quantity of information and the implementation combinations, to determine a probability of each possible implementation combination; and using the processor to analyze all of the probabilities of each implementation combination and to assign a rank to each implementation combination, for each one of the potential products, the rank assisting in determining which ones of the potential products to develop.

In still another aspect the present disclosure relates to a method comprising identifying a plurality of potential products; identifying a plurality of potential customers; assessing the salability attributes of the potential products from the perspective of the potential customers; inputting information using an input device relating to the potential products and the potential customers and attribute assessments to a processor; using the processor to determine, for each one of at least a plurality of the potential products and for each one of at least a plurality of the potential customers, the probability of the potential customer implementing the potential product; providing information relating to a threshold to the processor, the processor using the information to determine a location for the threshold demarcating a point separating a first quantity of the potential products to be developed and a different, second quantity of the potential products that are not to be developed; using the processor to assist in determining, based upon the processor determined probability determinations, which of the potential products to develop and to assign to the first quantity; and using the processor to provide a quantity of information relating to said first and second quantities of potential products to a display device such that said display device generates a visually readable table showing the potential products that the processor has classified in the first quantity of potential products and in the second quantity of potential products, with the first and second quantities being demarcated by the threshold.

Other features and advantages will be in part apparent and in part pointed out hereinafter.

BRIEF DESCRIPTION OF THE DRAWINGS

The drawings described herein are for illustration purposes only and are not intended to limit the scope of the present disclosure in any way.

FIG. 2 is a table that may be presented on a display device of the system of FIG. 1, showing a prioritization for twenty-three potential products and five potential customers.

Corresponding reference characters indicate corresponding parts throughout the several views of the drawings.

DETAILED DESCRIPTION

Figure 1:
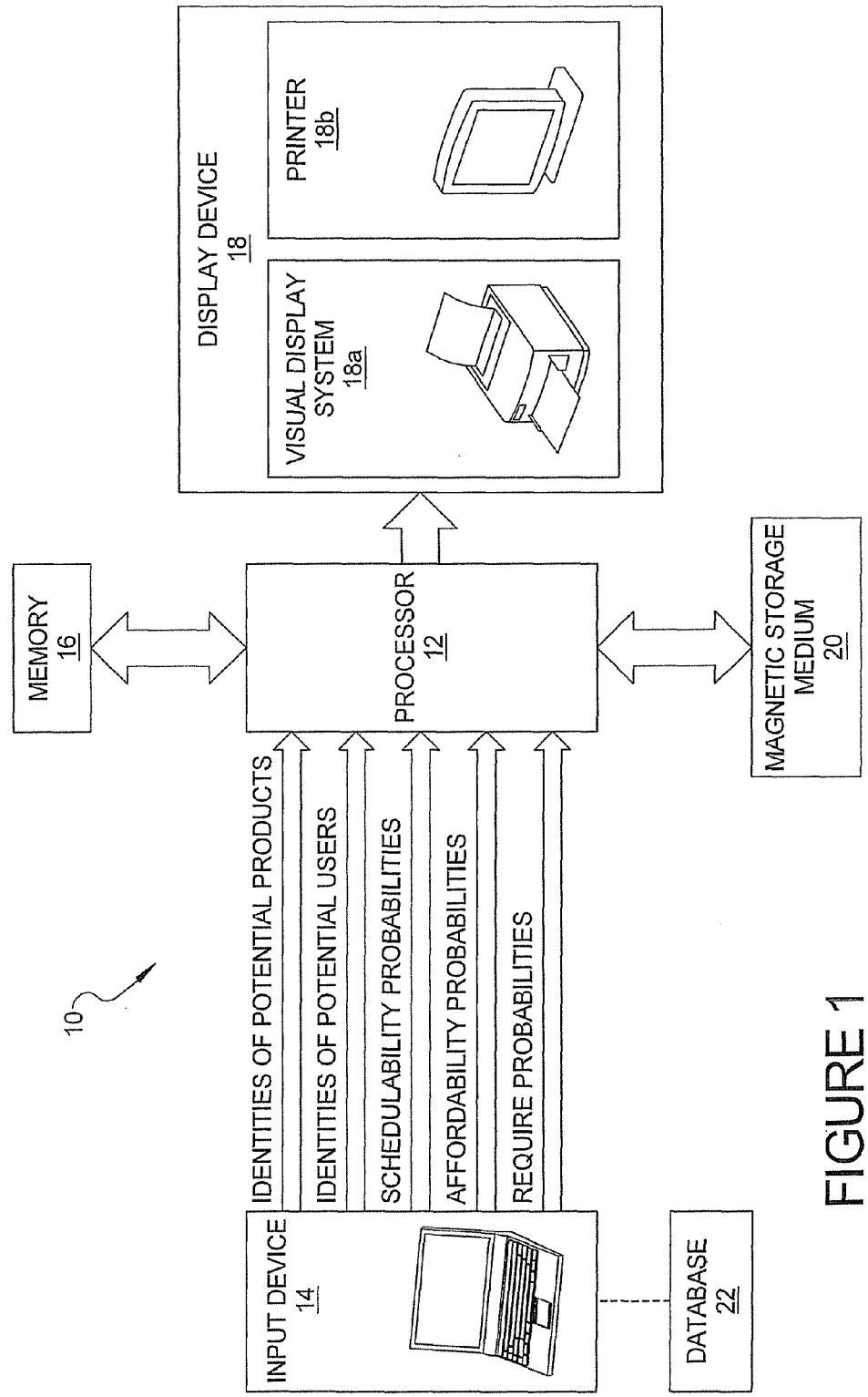
FIG. 1 is a block diagram of one embodiment of a system in accordance with the present disclosure that may be used to carry out a method of the present disclosure.

The present disclosure relates to a system and method for assisting a user in determining whether to develop potential products for potential customers. An example of a potential product may be a software capability. An example of a potential customer may be an entity such as a helicopter Program Management Office ("PMO") of the U.S. military that manages specific military projects. For example, specific PMO entities may be an RAH-66 Comanche PMO, an AH-64 Apache PMO, an CH-47 Chinook PMO, an UH-60 Black Hawk PMO, or unmanned aerial vehicles PMOs. Although the exemplary products addressed in connection with the present embodiment are described herein as being software products, it is to be understood that the teachings of the present disclosure may be used with virtually any other type of product that may be developed or engineered by a given entity. Also, although the exemplary customers addressed in connection with the present embodiment are helicopter PMO entities, it is to be understood that other types of customers (e.g., users, markets, companies, countries, governments, etc.), both military related and non-military related, may be employed without departing from the scope of this invention.

Development costs of a first product having a particular attribute (e.g., a particular system capability that supports its function or supports its compatibility with other systems) but developed for only a single user is often less than the development costs of a second product having the same attribute but developed for multiple users. If it is anticipated that only one user demands the attribute, then the first product should be developed to the exclusion of the second. If it is anticipated that more than one user demands the attribute, then development of the second product might be more economical. In the present example, the first product is a system capability for which a software application must be developed via a first helicopter PMO entity and the second product is a comparable system capability for which a comparable software application must be developed that can be used by the first helicopter PMO entity and by additional helicopter PMO entities. Also in the present example, the first product costs less to develop than the second product. If the only potential market for the system capability is the first helicopter PMO entity, then the better cost effective decision would be to not develop the second product should not be developed. If the potential market for the system capability includes additional helicopter PMO entities, then it is desirable to determine whether the probability of the potential market is sufficiently high to justify development of the second product instead of the first. Depending on anticipated development costs, it might be more economical to develop the second product (e.g., versatile software capable of being used by the different helicopter PMO entities) than to develop custom software for each type of helicopter. It will be understood that there can be a significant cost premium that is incurred by a manufacturer in developing software that is reusable for multiple applications or by multiple customers. The cost premium can often be approximately an additional 50% of the cost of developing non-reusable software. This premium suggests that a software application must be reused at least once for a cost benefit to occur.

In a leader/follower relationship, an implementation of a capability involves two steps. First software for the capability is developed for the leader and then one or more followers reuse the software. The leader/follower relationship is referred to as "dependency". For a follower to realize a large cost avoidance when implementing a capability: (a) the capability should first become a requirement for the follower; (b) there should be a leader to perform the original development; (c) it should be possible to schedule the follower's implementation to follow the leader's; and (d) the affordability improvements achievable through reuse should be sufficient. In other words, for a follower to implement a capability, the capability should be requirable, affordable, and schedulable. The necessity for all three criteria to be met is referred to as "conditional". The event that the leader will implement a capability is independent of the event that any other platform will implement the capability. The event that a follower will implement a capability is independent of the event that any other follower will implement the capability. This type of problem is conveniently analyzed using Bernoulli Processes and Binomial Statistics.

The event that the leader will implement a capability is independent of the event that any other platform will implement the capability. A set of all possible mutually exclusive outcomes of an experiment is called a sample space. And since there is only one leader per capability, there are only two points in the sample space: (1) the leader implements the capability; and (2) the leader fails to implement the capability.

The implementation of a capability by a follower is assumed to be conditional on three things: becoming requirable, becoming affordable, and becoming schedulable (i.e., schedulable or meaning "available"). Thus, the event being sought is:

EF=Follower requires the capability and can afford it and can schedule it.

Probabilities are assigned to each event. The probabilities may be determined by expert opinion or by any other suitable means. The probabilities for each event may include:

P(FR)=probability that the follower requires the capability;

P(FA)=probability that the follower can afford the capability;

P(FS)=probability that the follower can schedule the capability;

The above three probabilities are conditional probabilities. The probability of the event EF is the product of the conditional probabilities:

$$P(EF)=P(FR)*P(FA)*P(FS)$$

The probability P(EF) is also referred to herein as the probability of the potential customer (e.g., follower) implementing the potential product (e.g., software capability). The probability P(FR) is also referred to herein as a "requirability probability". The probability P(FA) is also referred to herein as an "affordability probability", and the probability P(FS) is also referred to herein as an "availability probability" (or "schedulability probability").

A set of all possible mutually exclusive outcomes of an experiment is called a sample space. In order to use a sample space to solve problems, the probabilities of each of the points of the sample space should be obtained. Each point in the sample space may be defined by dimensions that can assume the value "success" or "failure". For example, if the experiment consists of three followers attempting to reuse a capability, then the uniform sample space is:

(a) followers #1, #2, and #3 all fail to implement the capability;
(b) follower #1 succeeds and followers #2 and #3 fail;
(c) follower #2 succeeds and follower #1 and #3 fail;
(d) follower #3 succeeds and follower #1 and #2 fail;
(e) followers #1 and #2 succeed and follower #3 fails;
(f) followers #1 and #3 succeed and follower #2 fails;
(g) followers #2 and #3 succeed and follower #1 fails; and
(h) followers #1, #2, and #3 all succeed.

Each combination (b)-(h) is referred to as an implementation combination. In order to use a sample space to solve problems, the probability of each implementation combination should be obtained. Again using the example of three followers attempting to reuse a capability, the probabilities associated with the following events may be computed:

EF1=follower #1 requires the capability and can afford it and can schedule it;
EF2=follower #2 requires the capability and can afford it and can schedule it; and
EF3=follower #3 requires the capability and can afford it and can schedule it.

The probabilities that each respective event will occur may be expressed as:

$$P(EF1)=P(FR1)*P(FA1)*P(FS1)$$

$$P(EF2)=P(FR2)*P(FA2)*P(FS2)$$

$$P(EF3)=P(FR3)*P(FA3)*P(FS3)$$

The respective probabilities of the implementation combinations are:

$$PF1=[1-P(EF1)][1-P(EF2)][1-P(EF3)]$$

$$PF2=[P(EF1)][1-P(EF2)][1-P(EF3)]$$

$$PF3=[1-P(EF1)][P(EF2)][1-P(EF3)]$$

$$PF4=[1-P(EF1)][1-P(EF2)][P(EF3)]$$

$$PF5=[P(EF1)][P(EF2)][1-P(EF3)]$$

$$PF6=[P(EF1)][1-P(EF2)][P(EF3)]$$

$$PF7=[1-P(EF1)][P(EF2)][P(EF3)]$$

$$PF8=[P(EF1)][P(EF2)][P(EF3)]$$

As mentioned earlier, in a reuse example the process for implementation of a capability involves two steps. First the leader successfully develops the software for the capability and then one or more followers reuse the software. As far as the followers are concerned, the criteria for reuse is that one or more followers should reuse the software. Thus, if P(B:A) is the probability of the event that one or more platforms reuse the software (event B) given that the leader has developed the software (event A), then:

$$P(B:A)=PF2+PF3+PF4+PF5+PF6+PF7+PF8$$

It is also possible to write P(B:A) using the theorem of normalcy, i.e., the sum of the probabilities of the points in the event space add up to unity. Saying that one or more platforms succeed in reusing the software is the same as saying that none of the platforms fail to reuse the software, i.e.

$$P(B:A)=1-PF1$$

Success is defined as development by the leader and reuse by the follower, i.e., $$P(A,B)=P(A)*P(B:A)=P(EL)*(PF2+PF3+PF4+PF5+PF6+PF7+PF8)$$

The expected value of a random variable is the weighted sum of all the values of the variable, each value weighted by its probability of occurrence. The average number of instances of software reused and the likelihood that it will occur gives a measure of the value of reuse for any given capability. Consider the implementation combinations below.

(a) followers #1, #2, and #3 all fail to implement the capability;
(b) follower #1 succeeds and followers #2 and #3 fail;
(c) follower #2 succeeds and follower #1 and #3 fail;
(d) follower #3 succeeds and follower #1 and #2 fail;
(e) followers #1 and #2 succeed and follower #3 fails;
(f) followers #1 and #3 succeed and follower #2 fails;
(g) followers #2 and #3 succeed and follower #1 fails; and
(h) followers #1, #2, and #3 all succeed.

As indicted above, the respective probabilities of the implementation combinations may be expressed as:

$$PF1=[1-P(EF1)][1-P(EF2)][1-P(EF3)];$$

$$PF2=[P(EF1)][1-P(EF2)][1-P(EF3)];$$

$$PF3=[1-P(EF1)][P(EF2)][1-P(EF3)];$$

$$PF4=[1-P(EF1)][1-P(EF2)][P(EF3)];$$

$$PF5=[P(EF1)][P(EF2)][1-P(EF3)];$$

$$PF6=[P(EF1)][1-P(EF2)][P(EF3)];$$

$$PF7=[1-P(EF1)][P(EF2)][P(EF3)]; \text{ and}$$

$$PF8=[P(EF1)][P(EF2)][P(EF3)].$$

The number of successes for the $i^{th}$ point in the sample space is represented as "NSi". The values that NSi may assume are 0, 1, 2, or 3. Thus, for each point in the sample space the corresponding values of NS are:

NS1=0;
NS2=1;
NS3=1;
NS4=1;
NS5=2;
NS6=2;
NS7=2; and
NS8=3.

The Expected Value of the number of reuse instances may then be given by the equation:

$$E(NS)=NS1*PF1+NS2*PF2+NS3*PF3+NS4*PF4+NS5*PF5+NS6*PF6+NS7*PF7+NS8*PF8.$$

The expected value of the number of reuse instances can be determined for each product (e.g., for each software capability). A product developer may rank the products based on the E(N) for each product and then develop those products whose E(N) is greater than or equal to a threshold value.

A second metric to break ties in E(N) might sometimes be desirable. It is believed that there is a premium to be paid for developing software that is reusable. It is believed that such premium tends to be about an additional 50% of the cost of developing non-reusable software. This premium suggests that a software application should be reused at least once for a cost benefit to occur. A measure of the probability that one or more platforms will successfully reuse the mission software, $P(N \geq 1)$, may be calculated to serve as a secondary metric for ranking the products.

Referring now to FIG. 1, a system 10 is shown in accordance with one embodiment of the present disclosure for carrying out the methodology described herein. The system 10 may comprise a processor 12, which may also be a stand alone processor or part of another computer system. The processor 12 is in communication with an input device 14, which in this example is shown as a laptop computer. It will be appreciated though that any form of input device may be used to input the various information to the processor 12, and that such devices might comprise hand held digital devices, desktop computers, or any other component or subsystem that is suitable for inputting the information. The information may be input directly from the input device 14 as shown, or communication between the input device 14 and the processor 12 may be via a local area network (LAN) or a wide area network (WAN). One example of a wide area network would be the Internet.

The system 10 further comprises a memory 16 that the processor 12 may use during the course of performing the various statistical calculations described herein. The results of the processor's 12 calculations and analysis may be transmitted to a display system 18 that may involve a computer terminal 18a, a printer 18b or any other form of display device. The results of the processor's 12 calculations and analysis may also be stored for future access in a suitable magnetic storage medium 20, for example a hard disc drive, magnetic tape or any other form of magnetic storage medium. The input device 14 may optionally be in communication with a database 22 that holds various information, such as the names of customers, products, previously determined probabilities, etc., that the user will be inputting to the processor 12.

FIG. 2 is a table showing software product prioritization for twenty-three products (e.g., software products) for five potential customers. The customers are denoted in the table as "User 1" through "User 5". The table shown in FIG. 2 may be generated by the processor 12 through the various calculations described above and in connection with the operations described in the following flowchart in FIG. 3. The table shown in FIG. 2 may be generated by the display device 18 in response to a quantity of information supplied from the processor 12 that enables the display device 18 to display, or to print, the resulting probability information for each of the potential products and each of the potential customers. The information presented by the processor 12 may be demarcated by a threshold, indicated by the darkened line T1 in FIG. 2, that separates a first quantity of information that represents those potential products that may be developed, and a second quantity of information representing those potential products that are not to be developed. Alternatively, the information shown in the table of FIG. 2 may be stored on the magnetic storage medium 20 for future use.

In the table of FIG. 2 the five potential User's 1-5 may be considered as five different types of helicopters programs (i.e., as customers). The user names have been previously input to the processor 12 using the input device 14. Similarly, the names of potential products have also been previously input to the processor 12 via the input device 14.

Under the heading "Requirability" are requirability probabilities that have been previously input by a user of the system 10 via the input device 14. Each requirability probability in the table of FIG. 2 is associated with one of the twenty three products and one of the five potential customers. A requirability probability is the probability that a potential customer requires a potential product. Preferably, each requirability probability is determined by expert analysis (e.g., expert opinion) and has been previously input to the processor 12 via the input device 14.

Under the heading "Affordability" are affordability probabilities. Each affordability probability in the table of FIG. 2 is associated with one of the twenty three products and one of the five potential users (i.e., customers). An affordability probability is the probability that a potential user (i.e., customer) is willing to pay for the potential product. Preferably, each affordability probability is determined by expert analysis (e.g., expert opinion), and has been input to the processor 12 via the input device 14.

Under the heading "Schedulability" are schedulability probabilities. Each schedulability probability in the table of FIG. 2 is associated with one of the twenty three products and one of the five potential customers. A schedulability probability is the probability that a potential product is schedulable (i.e., available for) the potential user. Preferably, each schedulability probability is determined by expert analysis (e.g., expert opinion), and has been previously input to the processor 12 via the input device 14.

Under the heading "Probability of Reuse" are reuse probabilities. A reuse probability (or more broadly referred to as an implementation probability) is the probability that a potential customer will implement a product. In the present example, the implementation probabilities are reuse probabilities, i.e., the probability that a follower will implement a product to be developed for a leader. However, it is to be understood that the present disclosure is not limited to reuses. If a reuse situation is not involved, then the availability does not involve schedulability after a leader. The implementation (i.e., reuse) probability for a customer and a product may be expressed as the mathematical product of the requirability, affordability and schedulability (i.e., availability) probabilities of the customer and one of the products. For example, the probability that User 1 will implement Product 2 is 0.27, and is calculated by multiplying together the corresponding requirability probability (0.3), affordability probability (0.9), and availability probability (1.0). Likewise, the probability that User 5 will implement Product 3 is 0.41, and is calculated by taking the product of the corresponding requirability, affordability and availability probabilities (i.e., (0.45)(0.9) (1.0)=0.41).

In FIG. 2 two columns are under the heading "Bernoulli Analysis." The first column includes the E(N) for each product. The second column includes the probabilities of at least one reuse $P(N \geq 1)$. In the table of FIG. 2 the products may be ranked by the processor 12 by E(N) and $P(N \geq 1)$ values. The dark solid horizontal line T1 between Products 12 and 13 represents the threshold value. Based on the threshold value, it may be determined that Products 1-12 should be developed and Products 13-23 should not be developed.

Figure 3:
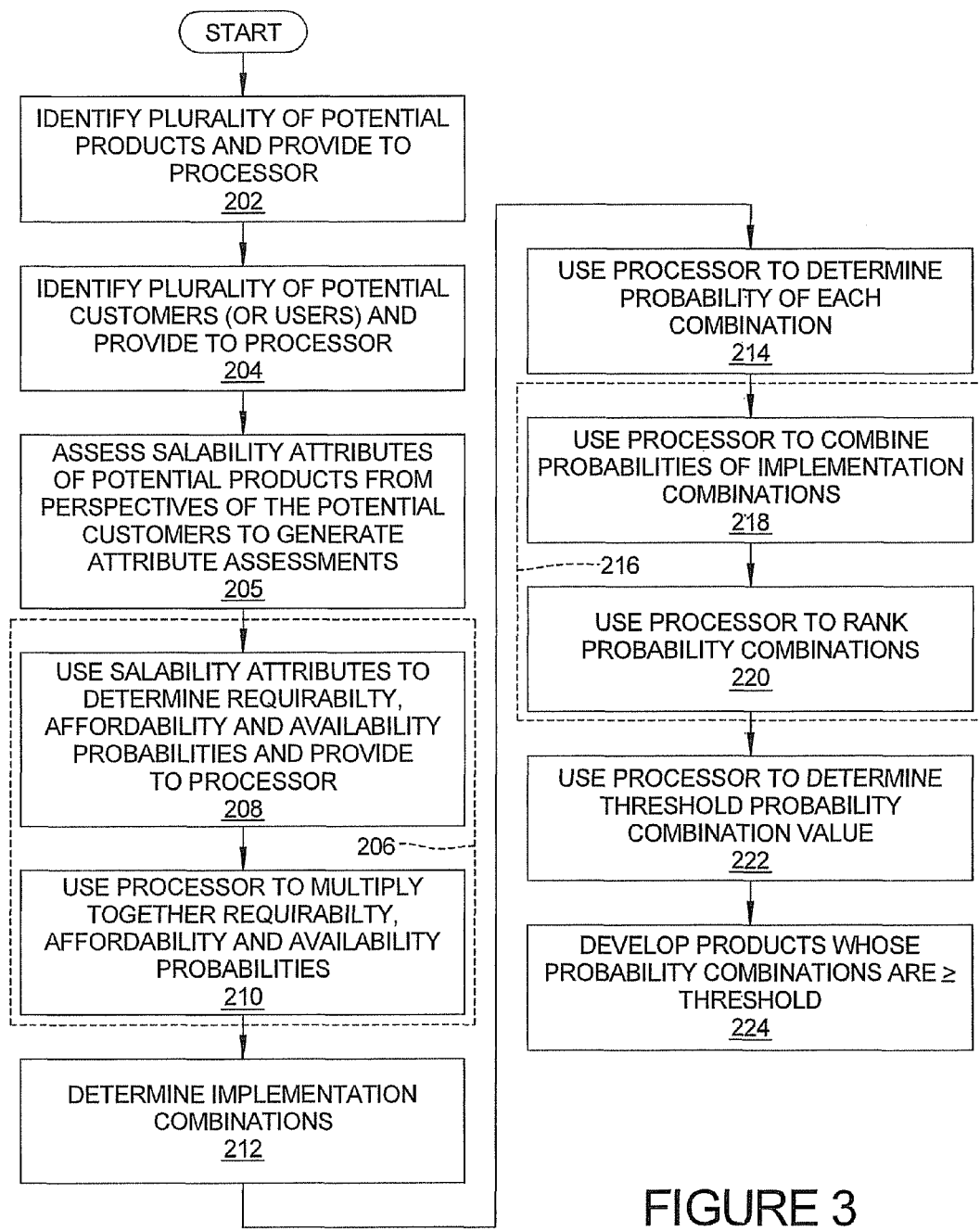
FIG. 3 is a flow diagram illustrating operations that may be performed in one aspect of the present disclosure to provide the probability information concerning the potential products and the potential customers, and the likelihood that a customer will use a potential product.

FIG. 3 is a flow diagram, generally indicated at 200, of one method of the present disclosure for determining whether to develop products, such as software products or hardware products, for potential customers, such as different types of helicopters programs. A plurality of potential products are identified at operation 202. This identification of potential products corresponds to the column under the heading "Products" in FIG. 2. A plurality of potential customers are identified at operation 204. At operation 205 the system designer assesses salability attributes of the potential products from perspectives of the potential customers to generate attribute assessments. The information from operations 202, 204 and 205 may be input directly to the processor 12 via the input device 14 or from the database 22. The next operational phase, represented by dashed line 206, is the operation of determining, for each one of at least a plurality of the potential products and for each one of at least a plurality of the potential customers, and using the attribute assessments, the probability of the potential customer implementing the potential product. As discussed above these probabilities are P(EF). The probability (P(EF)) of the potential customer implementing the potential product comprises determining the requirability, affordability and availability probabilities for the product and customer, at operation 208, and using the processor 12 to multiply together these probabilities, as indicated at operation 210. Alternatively, these probabilities may be determined in advance by expert analysis or any other suitable methods and supplied to the processor 12 for use with subsequent calculations.

The implementation combinations (discussed in greater detail above) for each product are determined at operation 212 and the probabilities of the implementation combinations P(F) are determined by the processor 12 at operation 214. The next operational phase 216 involves deciding, based upon probability determinations, which of the potential products to develop. The operation of deciding which of the potential products to develop may comprise using the processor 12 to combine the probabilities of the implementation combinations P(F) for each product, as indicated at operation 218. At operation 220 the processor 12 may rank the probability combinations and output the ranked combinations to be displayed on the display terminal 18a or printed out in a report on the printer 18b. At operation 222 a threshold probability combination value may be determined by the processor 12 based on previously provided data or cost parameters by a user of the system 10. Preferably, the operation of combining the probabilities of the implementation combinations comprises using the processor 12 to determine expected value numbers E(N) for each product and/or determining the probability of at least one reuse P(N≧1) for each product. The next operation 224 involves developing the products decided at operational phase 216. The operation of developing the products may comprise developing each product whose corresponding probability combination is equal to or greater than the threshold probability combination value (i.e., above threshold line T1).

Although the customers (or "users") have been described as helicopters programs, it is to be understood that the terms "customers" and "customer" are not limited to helicopters programs, but may involve any entity or application. Also, it is to be understood that the term "products" is not limited to software products or to hardware products, but may involve any virtually any type of product that may be developed, engineered or manufactured by an entity.

As various changes could be made in the above systems and methods without departing from the scope of the present disclosure, it is intended that all matter contained in the above description or shown in the accompanying drawings shall be interpreted as illustrative and not in a limiting sense. The present disclosure therefore shall be limited solely by the scope of the claims set forth below.

What is claimed is:

1. A method of determining whether to develop products for potential customers, comprising:
   identifying a plurality of potential products;
   identifying a plurality of potential customers;
   assessing an affordability probability of the potential products; assessing a requirability probability of the potential customers;
   assessing a schedulability probability of the potential customers;
   assessing a reuse probability of the potential products, wherein the reuse probability is based on:
      at least one a first product of the plurality of products being implemented by a first customer of the plurality of customers;
      the affordability probability of the at least one first product;
      the requirability probability of a second customer of the plurality of customers, wherein the requirability probability of the second customer is the probability that the second customer will require the at least one first product and wherein the requirability probability of the second customer is dependent on the first product being implemented by the first customer; and
      the schedulability probability of the second customer;
   assessing salability attributes of the potential products from perspectives of the potential customers to generate attribute assessments;
   using an input device to enable a user to input said pluralities of potential products and potential customers, as well as the attribute assessments, to a processor;
   using said processor to determine, for each of the potential products, based on the attribute assessments, all possible implementation combinations in which at least n of the potential customers implement the product, where n is a positive whole number;
   using the processor to determine the probability of each said implementation combination, for each said product; and
   using said processor to consider the affordability probability of the potential products, the requirability probability of the potential customers, and the schedulability probability of the potential customers, and the reuse probability of potential customers to assist in determining, based upon the probability determinations, which of the potential products to develop.

2. The method as set forth in claim 1 wherein said using the processor to assist in deciding which of the potential products to develop comprises:
   using said processor to combine, for each said potential product, the probabilities of the implementation combinations for each said potential product such that each said potential product has a corresponding probability combination; and
   using the processor to rank the probability combinations.

3. The method of claim 1, further comprising using a display device in communication with said processor to provide a display of said ranked implementation combinations.

4. The method of claim 1, wherein said processor includes a threshold line in said display that indicates a cutoff point demarcating first ones of said potential products to be developed and second ones of said potential products that are not to be developed.

5. A method of claim 1, wherein said identifying a plurality of potential products comprises identifying one of a plurality of potential software products and potential hardware products.

6. A method of claim 1, wherein said identifying a plurality of potential customers comprises identifying a plurality of different types of helicopters programs.

7. A method of claim 1, wherein said using the processor to assist in determining which of said potential products to develop comprises using the processor to add together the probabilities of the implementation combinations for each said potential product.

8. The method of claim 1, further comprising:
using the processor to determine, for each one of at least a plurality of the potential products and for each one of at least a plurality of the potential customers, the probability of the potential customer implementing the potential product.

9. A method of claim 1, wherein said using said processor to determining the probability of each said implementation combination comprises:
wherein determining the requirability probability includes determining that a probability that the potential customer requires the potential product;
wherein determining an affordability probability includes determining that a probability that the potential customer is willing to pay for the potential product;
wherein determining the schedulability probability includes determining that a probability that the potential product is available to the potential customer; and
using the processor to multiply together the requirability probability, the affordability probability, and the schedulability probability.

10. A method comprising:
identifying a plurality of potential products;
identifying a plurality of potential customers;
assessing an affordability probability of the potential products;
assessing a requirability probability of the potential customers;
assessing a schedulability probability of the potential customers;
assessing a reuse probability of the potential products, wherein the reuse probability is based on:
at least one a first product of the plurality of products being implemented by a first customer of the plurality of customers;
the affordability probability of the at least one first product;
the requirability probability of a second customer of the plurality of customers, wherein the requirability probability of the second customer is the probability that the second customer will require the at least one first product and wherein the requirability probability of the second customer is dependent on the first product being implemented by the first customer; and
the schedulability probability of the second customer;
assessing the salability attributes of the potential products from the perspective of the potential customers to generate attribute assessments; inputting information, including the attribute assessments, using an input device relating to said potential products and said potential customers to a processor;
using said processor to determine, using the attribute assessments, and for each one of at least a plurality of the potential products and for each one of at least a plurality of the potential customers, the probability of the potential customer implementing the potential product;
providing information relating to a threshold to the processor, the processor using the information to determine a location for the threshold demarcating a point separating a first quantity of said potential products to be developed and a different, second quantity of said potential products that are not to be developed;
using the processor to assist in determining, based upon the processor determined probability determinations, which of the potential products to develop and to assign to said first quantity; and
using the processor to provide a quantity of information relating to said first and second quantities of potential products to a display device such that said display device generates a visually readable table showing said potential products that said processor has classified in said first quantity of potential products and in said second quantity of potential products, with said first and second quantities being demarcated by said threshold.

11. A method as set forth in claim 10, wherein said using the processor to determine the probability of the potential customer implementing the potential product comprises:
determining a requirability probability, the requirability probability being the probability that the potential customer requires the potential product;
determining an affordability probability, the affordability probability being the probability that the potential customer is willing to pay for the potential product; and
determining an availability probability, the availability probability being the probability that the potential product is available to the potential customer.

12. A method as set forth in claim 11, wherein said using the processor to determine the probability of the potential customer implementing the potential product comprises multiplying together the requirability probability, the affordability probability, and the availability probability.

13. The method of claim 12, wherein said using the processor to assist in determining which of the potential products to develop comprises:
using said processor to determine, for each of the potential products, all possible implementation combinations in which at least n of the potential customers implement the potential product, where n is a positive whole number; and
using the processor to determine the probability of each said implementation combination, for each said potential product.

14. The method of claim 13, wherein said using the processor to assist in determining which of said potential products to develop comprises using the processor to add together the probabilities of the implementation combinations for each said potential product.

15. The method of claim 11, wherein said generating a visually readable list using said display device comprises generating a visually readable table that includes:
said requirability probability of each said potential customer for each of said potential products;
said affordability probability of each said potential customer for each of said potential products;
said availability probability of each said potential customer for each of said potential products; and
a probability of reuse of each said potential product by each said potential customer.

* * * * *